United States Patent
Brockerhoff et al.

(10) Patent No.: US 9,274,998 B2
(45) Date of Patent: Mar. 1, 2016

(54) DRIVE TRAIN CONTROL

(71) Applicant: Infineon Technologies AG, Neubiberg (DE)

(72) Inventors: Philip Brockerhoff, Munich (DE); Jens Barrenscheen, Munich (DE); Toralf Hoffmann, Feldkirchen-Westerham (DE); Roland Schwenk, Hoehenkirchen-Siegertsbrunn (DE); Diego Torrecilla, Dortmund (DE)

(73) Assignee: Infineon Technologies AG, Neubiberg (DE)

( * ) Notice: Subject to any disclaimer, the term of this patent is extended or adjusted under 35 U.S.C. 154(b) by 216 days.

(21) Appl. No.: 13/954,795

(22) Filed: Jul. 30, 2013

(65) Prior Publication Data
US 2015/0039949 A1  Feb. 5, 2015

(51) Int. Cl.
*G06F 11/16*  (2006.01)
*G06F 13/42*  (2006.01)

(52) U.S. Cl.
CPC ........ *G06F 13/4282* (2013.01); *G06F 11/1625* (2013.01)

(58) Field of Classification Search
CPC ......... G06F 13/00; G06F 13/38; G06F 13/42; G06F 13/4282; G06F 11/00; G06F 11/07; G06F 11/16; G06F 11/1608; G06F 11/1625
USPC .............. 701/22, 29.1, 29.2, 29.7, 31.7, 31.8, 701/31.9, 32.7, 33.7, 34.4, 99–115, 67–68, 701/41–66; 340/2.1, 2.7, 3.1, 3.43
See application file for complete search history.

(56) References Cited

U.S. PATENT DOCUMENTS

| | | | | | |
|---|---|---|---|---|---|
| 5,159,595 | A * | 10/1992 | Flanagan | ................ | H04J 3/085 340/2.7 |
| 5,646,936 | A * | 7/1997 | Shah | .................. | G06F 11/2007 340/2.7 |
| 6,947,377 | B1 * | 9/2005 | Shimano | ............. | H04J 14/0227 340/2.1 |
| 7,834,754 | B2 * | 11/2010 | Kulesz | ................... | G08B 21/12 340/3.1 |
| 8,295,163 | B1 * | 10/2012 | Schmalz | ............. | H04L 43/0811 324/533 |
| 2007/0251236 | A1 * | 11/2007 | Barthelet | ............ | H02P 23/0036 60/608 |
| 2009/0218977 | A1 * | 9/2009 | Pan | ....................... | H02M 7/493 318/445 |
| 2011/0093632 | A1 * | 4/2011 | Aue | .................. | H04L 12/40032 710/105 |
| 2011/0285437 | A1 * | 11/2011 | Benchaib | .............. | H02J 3/1857 327/156 |
| 2013/0049659 | A1 * | 2/2013 | Marquardt | ............ | H02M 7/797 318/400.23 |
| 2013/0173108 | A1 * | 7/2013 | Hashimoto | ............ | B60K 6/445 701/22 |
| 2014/0309886 | A1 * | 10/2014 | Ricci | .................. | G07C 9/00158 701/41 |
| 2014/0320050 | A1 * | 10/2014 | Kopken | ............... | H02M 7/5387 318/400.27 |

* cited by examiner

*Primary Examiner* — Thomas G Black
*Assistant Examiner* — Sara Lewandroski
(74) *Attorney, Agent, or Firm* — Shumaker & Sieffert, P.A.

(57) ABSTRACT

Various techniques relating to drive train control are disclosed. In an embodiment, in a first mode of operation communication between a controller and a submodule of the drive train takes place via a first communication channel and optionally additionally via a second communication channel. In a second mode of operation, upon failure of the first communication channel, communication with the submodule of the drive train takes place via the second communication channel.

20 Claims, 5 Drawing Sheets

DRIVE TRAIN CONTROL

TECHNICAL FIELD

The present application relates to methods and apparatuses related to controlling a drive train or parts thereof.

BACKGROUND

Drive trains, for example for automotive applications, may comprise various devices, for example electric motors, which may be controllable to ensure correct functioning of the drive train. For example, an electric motor may comprise a plurality of coils, and to ensure correct operation of the electric motor appropriate currents have to be supplied to the coils. Such currents may for example comprise multi-phase alternating currents (AC) which may be generated by appropriate direct current/alternating current (DC/AC) converters based on a DC voltage provided for example in an automotive environment like a car. A proper control of the DC/AC conversion or other parameters involved in operating the electric motor may ensure an operation of the electric motor which corresponds to a desired operation.

Controlling operation of a drive train may involve the use of communication channels to transmit signals like control signals. Failure of such a communication channel may in some circumstances render the drive train inoperable.

BRIEF DESCRIPTION OF THE DRAWINGS

Illustrative embodiments will be explained with reference to the attached drawings, wherein.

DETAILED DESCRIPTION

In the following, various embodiments will be described in detail with reference to the attached drawings. It should be noted that these embodiments serve illustrative purposes only and are not to be construed as limiting the scope of the present application.

Features of different embodiments may be combined with each other to form additional embodiments. Furthermore, describing an embodiment with a plurality of features or elements is not to be construed as indicating that all those features or elements are necessary for forming embodiments. Instead, in other embodiments, some features or elements may be omitted, features or elements may be replaced by alternative features or elements, and/or additional features or elements may be provided.

Some embodiments relate to controlling a drive train or part thereof, for example to controlling an electric motor of a drive train. In some embodiments, a controller and one or more submodules are provided. In a first mode of operation, the controller may communicate with the one or more submodules via a first communication channel using a first communication protocol. Optionally, in the first mode of operation, in some embodiments the controller may communicate with the submodules via a second communication channel using a second communication protocol different from the first communication protocol. The second communication channel may have a different error profile than the first communication channel, for example may be less prone at least to some kinds of errors or failures. In some embodiments, the second channel may be more reliable, for example generally less prone to errors or failure, than the first communication channel. In some embodiments, the first communication channel may enable a faster communication than the second communication channel. For example, the first communication channel may have a lower latency than the second communication channel. A latency of a communication channel as generally understood in the art is a measure for a time delay data or information experiences when being transmitted over the communication channel. A higher latency is associated with a greater time delay, while a lower latency is associated with a smaller time delay.

In a second mode of operation, when the first communication channel fails the controller may communicate with the one or more submodules or a subset thereof, e.g. with a submodule of the one or more submodules for which the first communication channel has failed, via the second communication channel.

A communication channel in this respect refers to a path over which data may be sent and/or received. Communication channels may be associated with a certain communication medium. For example, optical communication channels using optical fibers or wire-based communication channels using electrical cables or other electrical connections may be used.

Figure 1:
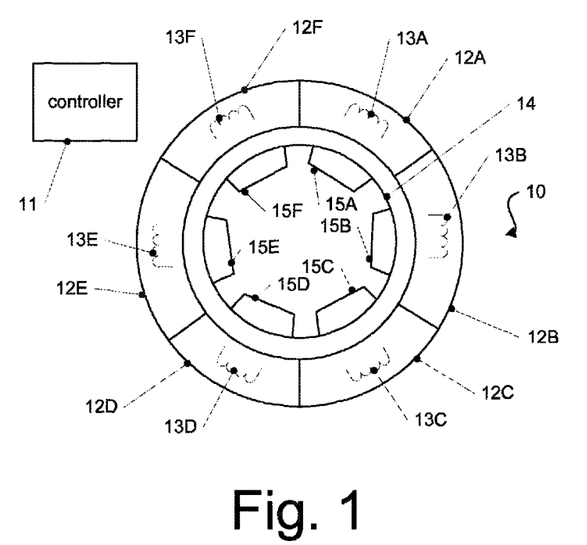
FIG. 1 is a schematic representation of an apparatus according to an embodiment.

Turning now to the figures, in FIG. 1 an electric motor 10 with an associated controller 11 is shown. Electric motor 10 is an example for a drive train or part thereof. In some embodiments, electric motor 10 may be a motor usable in automotive applications. In some embodiments, electric motor 10 may also be used as generator, i.e. for generating a current. Such a generator may also be referred to as an alternator e.g. in the automotive industry.

Electric motor 10 in the embodiment of FIG. 1 comprises a plurality of segments 12A to 12F, collectively referred to in the following as segments 12. While six segments 12 are shown, the number of segments is not particularly limited, and any desired number of segments may be used. Segments 12 in the embodiment shown form the so-called stator of the electric motor which is a part of a motor which remains stationary when the motor is driven.

In the embodiment of FIG. 1, each segment 12 comprises an associated coil 13A to 13F, collectively referred to as coils 13.

Furthermore, electric motor 10 comprises a rotor 14. Generally, a rotor refers to the part of a motor which rotates when the motor is driven. Rotor 14 has a plurality of magnets 15A to 15F, collectively referred to as magnets 15, attached thereto. While six magnets 15 are shown in FIG. 1, the number of magnets is not particularly limited. While the number of magnets 15 in the embodiment of FIG. 1 corresponds to the number of segments 12 and coils 13, in other embodiments, the number of magnets 15 may differ from the number of segments 12 or coils 13. Also, in some embodiments, the number of coils 13 may differ from the number of segments 12. Magnets 15 may for example be permanent magnets, but may also be electromagnets, for example electromagnets permanently supplied with current.

To drive motor 10, current is supplied to coils 13. In particular, a multi-phase alternating current may be supplied to coils 13, such that the current reaches its maximum value at different times in different coils. For controlling the supply of current to coils 13, controller 11 may be provided. For example, controller 11 may control a conversion of a direct current (DC) to a multi-phase alternating current (AC) via corresponding current converters.

Figure 2:
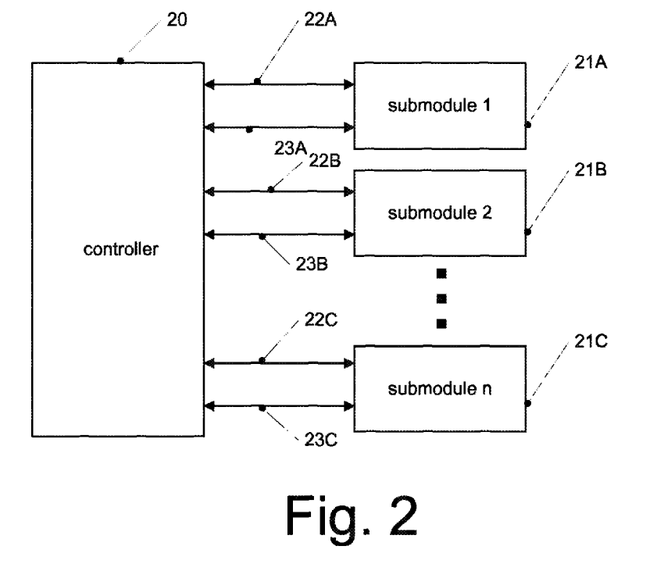
FIG. 2 is a block diagram of a controller arrangement according to an embodiment.

In FIG. 2, a controller arrangement according to an embodiment is shown, which may for example be used for implementing controller 11 of FIG. 1, but may also be used in other applications where a drive train or part thereof is to be controlled. The controller arrangement of FIG. 2 comprises a controller 20, also sometimes referred to as main controller, and a plurality of submodules 21A to 21C, collectively referred to as submodules 21 in the following. While three submodules are shown in FIG. 2, the number of submodules is not limited, and any number of submodules starting with a single submodule may be used. In some embodiments, each submodule 21 may supply power, i.e. current and voltage, to an associated part of a drive train. For example, in an embodiment each submodule 21 may supply power to one of coils 13 of electric motor 10 of FIG. 1. To this end, in some embodiments, each submodule may comprise a DC/AC converter to convert a direct current supplied for example by a battery of a car or other vehicle to an alternating current to be fed to the respective coil 13.

Operation of submodules 21 is controlled by controller 20. For example, in an embodiment where submodules 21 comprise DC/AC converters, controller 20 may control one or more parameters like output voltage, output current, phase, timing of input voltage etc. In other embodiments, other parameters may be controlled.

In the embodiment of FIG. 2, controller 20 communicates with each of submodules 21 via a first communication channel 22A, 22B, 22C, respectively (in the following collectively referred to as first communication channels 22), and via a plurality of second communication channels 23A, 23B, 23C, respectively (in the following collectively referred to as second communication channels 23). For example, controller 20 may have separate terminals for the first and the second communication channels, and also submodules 21 may have separate terminals for the first and second communication channels, as shown in FIG. 2.

Communication channels 22, 23 in FIG. 2 are depicted as bidirectional communication channels, although in other embodiments, communication channels 22 and/or communication channels 23 may also be unidirectional communication channels. Bidirectional communication channels may be realized by using a common transmission medium for both communication directions, but may also be implemented using separate communication media, for example separate wires or separate optical fibers. In other embodiments, additional communication channels may be provided.

The properties of first communication channels 22 in some embodiments differ from the properties of second communication channels 23. For example, in some embodiments, communication via first communication channels 22 may be less reliable, for example more prone to errors or failure, than communication via second communication channels 23. In some embodiments, communication via first communication channels 22 may be faster than communication via second communication channels 23. In some embodiments, different transmission media may be used for first communication channels 22 and second communication channels 23. For example, in some embodiments, first communication channels 22 may be implemented using optical fibers, and second communication channels 23 may be implemented using wire-based transmission, for example a bus system like a CAN (Controller Area Network) bus which is a bus system commonly used in automotive applications. Also other types of bus systems like an SPI (Serial Peripheral Interface) bus may be used. In embodiments, for example a second communication protocol used for the second communication channels 23 may involve the use of techniques for protecting data integrity like cyclic redundancy checks (CRC), repeated transmission, interleaving, encoding lower data rates or other measures known in the art making second communication channel 23A less prone to errors or failure than first communication channels 22. In some embodiments, a first communication protocol used for first communication channels 22 may also involve the use of some measure of protection against errors. In some embodiments, error protection techniques or other techniques used for the second communication channel may increase the latency of the second communication channel, i.e. a time delay data experiences when being transmitted via the second communication channel. In some embodiments the first communication channel is designed to have a low latency, for example by refraining from using some error protection techniques which increase latency. Therefore, in some embodiments the first communication channel may have a lower latency than the second communication channel. In some embodiments, by providing both the first communication channel and the second communication channel, both a channel having low latency for fast communication and a channel having good protection of data integrity may be made available. In this respect, it should be noted that in some cases it may be difficult to design a communication channel being both fast and reliable with costs and other issues being reasonable for the respective application, and providing two channels may be more efficient in some cases.

In some embodiments, in a first mode of operation controller 20 may communicate with submodules 21 via first communication channels 22. In other embodiments, in the first mode of operation, controller 20 may communicate with submodules 21 via both first communication channels 22 and second communication channels 23. For example, different types of signals, for example control signals for different parts of submodules 21, may be assigned to different communication channels, i.e. some types of signals may be assigned to first communication channels 22, whereas other types of signals may be assigned to second communication channels 23.

In a second mode of operation, which is used e.g. for a respective submodule when the first communication channels (22A, 22B or 22C) associated with the respective submodule fails, communication with the respective submodule is performed only via the second communication channel, which in some embodiments may be a more reliable communication channel. In such embodiments, even when a first communication channel fails, at least a limited operation of the respective submodule may be maintained via the respective second communication channel in some embodiments. In other embodiments, when a second communication channel fails, communication may be performed via the respective first communication channel to maintain at least limited operation.

Figure 3:
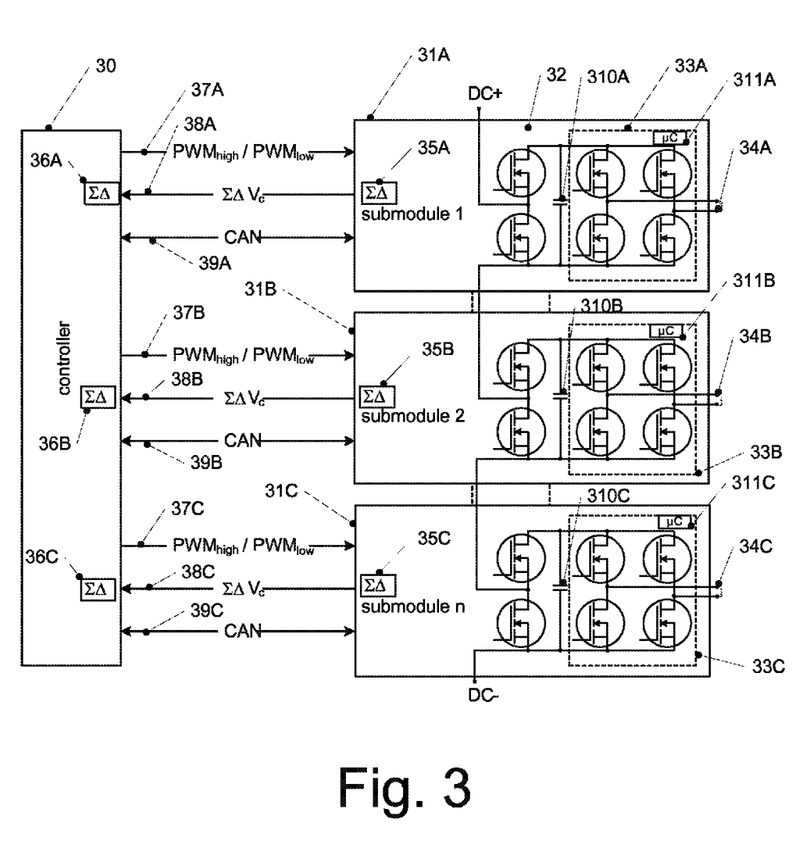
FIG. 3 is a diagram of a controller arrangement according to a further embodiment.

In FIG. 3, a controller arrangement according to a further embodiment is shown. The embodiment of FIG. 3 comprises a controller 30 and a plurality of submodules 31A, 31B, 31C, collectively referred to as submodules 31. While three submodules are shown in FIG. 3, the number of submodules is not limited to any particular number, and any number of submodules starting with a single submodule may be used. In the embodiment of FIG. 3, each submodule comprises a DC/AC converter. Coils 34A, 34B, 34C which may be coils of an electric motor as shown in FIG. 1 are coupled with respective outputs of submodules 31 to receive an AC current, although in other applications submodules 31 may also be used to supply and control other elements of a drive train. In some embodiments, a number of submodules may correspond to the number of coils of an electric motor to be controlled. In some embodiments, the submodules may be mounted directly to corresponding segments like segments 12 of FIG. 1 of an electric motor.

In the embodiment shown, a DC part of submodules 31 is generally labeled 32 and symbolized by two transistors which may operate as switches for each submodule 31, although in other implementations additional or different components may be used to implement a DC part of a DC/AC converter. As shown in FIG. 3, the DC parts of the various submodules are essentially coupled in series between a positive DC supply voltage DC+ and a negative DC supply voltage DC−.

Additionally, each submodule 31 comprises an AC part 33A, 33B, 33C, respectively, collectively referred to as AC parts 33 in the following. AC parts 33 are depicted as comprising four transistors each, although other implementations of AC parts are equally possible. Between the DC part and AC part of each submodule, a capacitor 310A, 310B or 310C, respectively, is arranged as shown.

It should be noted that while some elements of DC/AC converters are shown in FIG. 3 for illustrative purposes, any conventional implementation of a DC/AC converter known in the art may be used.

In the embodiment of FIG. 3, controller 30 controls operation of the DC parts of submodules 31 via a first communication channel 37A, 37B, 37C, respectively. Via this communication channel, which may be an optical communication channel or a wire-based communication channel, but is not limited thereto, the two transistors of each DC part, which act as switches, may be directly controlled via pulse width modulated signals $PWM_{high}$ and $PWM_{low}$, respectively, for example by directly or indirectly applying the signal $PWM_{high}$ to a gate terminal of a first one of the two transistors and the signal $PWM_{low}$ to a gate terminal of a second one of the two transistors. By controlling the transistors of the DC part, the respective capacitor 310 is charged or discharged. A voltage $V_C$ of capacitor 310A, 310B or 310C may be fed back to controller 30 via a communication channel 38A, 38B or 38C, respectively, collectively referred to as communication channels 38. Communication channels 38 may use the same physical transmission medium as communication channels 37, or may use a separate transmission medium, for example a separate transmission wire.

In some embodiments, the voltage $V_C$ is sigma-delta-encoded, i.e. converted to a bit stream, by respective sigma-delta-modulators 35A, 35B and 35C, for transmission of the corresponding sigma-delta data stream over communication channels 38, and demodulated by corresponding sigma-delta-demodulators 36A, 36B and 36C, respectively. However, other modulation/demodulation techniques and transmission techniques for feeding the value $V_C$ back to controller 30 may also be used. Depending on the value $V_C$ fed back, controller 30 may for example adjust the $PWM_{high}$ and $PWM_{low}$ signals for the respective submodules until $V_C$ matches a desired value.

Furthermore, each submodule 31 is coupled with controller 30 via a CAN bus 39A, 39B and 39C, respectively, acting as second communication channel, and being collectively referred to as CAN buses 39 in the following. In other words, in the embodiment of FIG. 3 each submodule 31 is coupled with controller 13 via its own bus line serving as a point-to-point-connection. Via CAN buses 39, for example target values for different parameters of AC parts 33 may be transmitted, for example for a motor current output to coils 34 or a rotor angle for the motor, which may be associated with a phase of the signal output. AC parts 33A may then regulate the operation of the respective AC parts to match with the target value using any conventional regulation approach. For example, for such a regulation a simple microcontroller 311A, 311B or 311C, respectively, may be used. AC part 33A may also feed back information, for example actual value, via CAN buses 39 to controller 30.

In some embodiments, in a first mode of operation, the DC parts and AC parts are controlled as described above. A second mode of operation may be used when a failure occurs. For example, upon a failure of the first communication channel 37A, 37B or 37C for a particular submodule, at least a limited control of the respective submodule may be performed via the associated CAN bus 39. For example, in some cases, still some operation may be possible via the respective CAN bus, or the respective submodule may be short-circuited, i.e. effectively taken out of operation or bypassed, such that the remaining submodules may continue normal operation, which may be sufficient for example to drive a motor. For example, when communication channel 37A of submodule 31A fails, submodule 31A may be short circuited using a control command via CAN bus 39A such that the voltage DC+ is directly applied to submodule 31B. Similar operations may occur for example when a respective microcontroller 311A fails. Also in this case, the respective submodule may be short circuited.

In other embodiments, when the respective CAN bus 39 fails, some limited operation may be possible via the respective first communication channel, or the submodule may be short circuited. For example, in the second mode of operation only a DC side may still be controlled, whereas the values for the respective AC part 33 remain constant.

The embodiment of FIG. 3 may be realized for example using application specific integrated circuits (ASICs, or may be implemented using discrete components, or a mixture thereof). Control functions in controller 30 may for example implemented in software, hardware, firmware or any combinations thereof.

Figure 4:
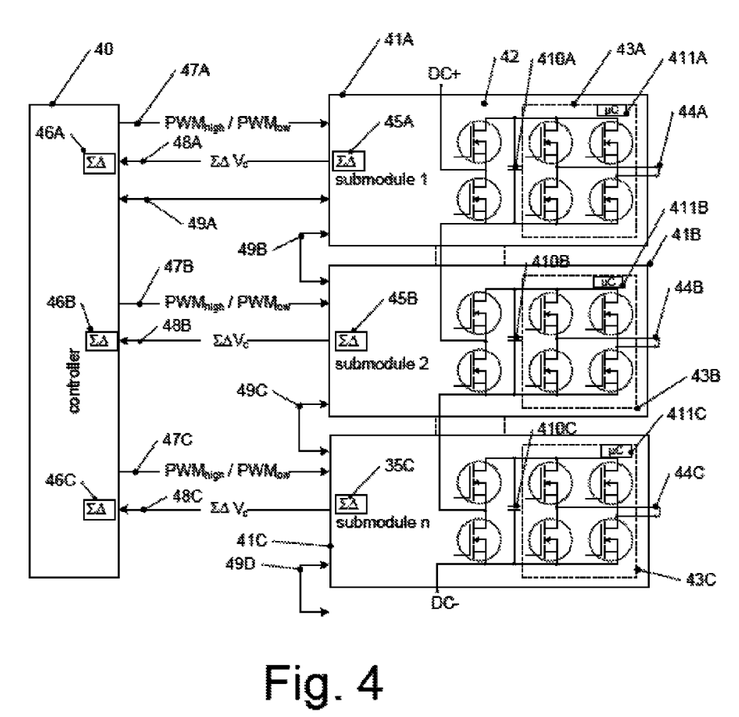
FIG. 4 is a diagram of a controller arrangement according to another embodiment.

A further embodiment of an apparatus is shown in FIG. 4. Apart from a topology of a bus which will be described below, the embodiment of FIG. 4 corresponds to the embodiment of FIG. 3, and corresponding elements bear the same reference numeral where only the leading digit "3" of FIG. 3 has been replaced by a leading digit "4". The description of the elements common to FIG. 3 and FIG. 4 will be omitted, and any variations, modifications etc. described with reference to FIG. 3 also apply to the embodiment of FIG. 4.

In the embodiment of FIG. 3, the CAN bus was essentially arranged in a topology using point-to-point connections, i.e. each submodule in FIG. 3 is coupled with controller 30 via a separate CAN bus line. In contrast, in FIG. 4 essentially a so-called ring or daisy chain topology is used. With such a topology, for example a SPI bus may be used. Here, for example submodule 41A is coupled with controller 40 via a first bus line 49A. Submodule 41B is coupled with submodule 41A via a second bus line 49B, submodule 41C is coupled with submodule 41B via a further bus line 49C, and further submodules may be coupled via further bus lines like bus line 49D. In some embodiments, a topology as used in FIG. 4 may require less cabling, but be more prone to errors (as a failure of for example bus line 49A may disrupt bus communication to all submodules in some cases) than the embodiments of FIG. 3. In some embodiments, to enable a more reliable communication, a last submodule may be coupled again with controller 40 (for example, bus line 49B could be coupled with controller 40) to "close the ring" and provide some redundancy. In yet other embodiments, other busses, for example a FlexRay-bus, may be used, and/or other bus topologies, for example a star-shaped topology where all submodules are coupled to a single main busline may be employed.

Figure 5:
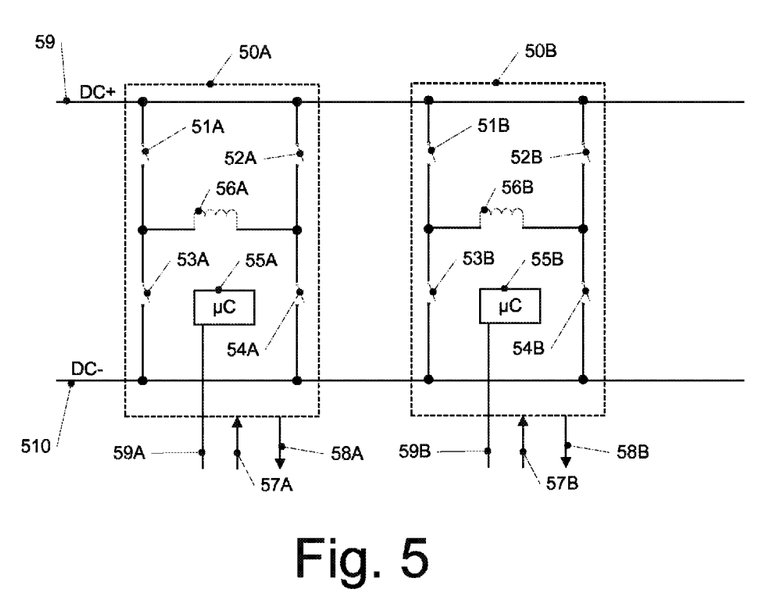
FIG. 5 is a diagram of submodules according to an embodiment.

In FIG. 5, an alternative configuration of submodules according to an embodiment is shown. In particular, in FIG. 5 two submodules 50A, 50B (collectively referred to as submodules 50) are shown which are coupled in parallel between DC voltage supplies 59 (DC+), 510 (DC−). Submodules 50 may be controlled by a controller like controller 20 of FIG. 2, controller 30 of FIG. 3 or controller 40 of FIG. 4, which is not shown in FIG. 5 to simplify the representation. While two submodules 50 are shown in FIG. 5, any number of submodules may be provided. In the embodiment shown, each submodule 50 supplies an AC current to a coil 56A or 56B, respectively, of an electric motor. In some embodiments, the number of submodules may correspond to the number of coils of the motor. In some embodiments, the submodules may be mounted directly to corresponding segments like segments 12 of FIG. 1.

In the embodiment of FIG. 5, each submodule 50 comprises four switches 51 to 54 (51A to 54A in case of submodule 50A and 51B to 54B in case of submodule 50B). Switches 51 to 54 may be implemented using transistors, for example MOS transistors. In the embodiment of FIG. 5, switches 51 to 54 may be controlled by a controller using pulse width modulated signals (PWM signals) sent via a respective first communication channel 57 (57A or 57B, respectively). For example, for each submodule four pulse width modulated signals may be used, one for controlling each of switches 51 to 54. First communication channel 57 may be for example an optical communication channel or a wire-based communication channel.

A current flowing through the respective coil 56A, 56B may be fed back to the controller via a communication channel 58A, 58B, respectively, collectively referred to as communication channels 58. Each communication channel 58 may use the same physical medium as the corresponding first communication channel 57 or may be implemented using a separate communication medium. In some embodiments, the current may be fed back to the respective controller via the respective communication channel 58 using a sigma-delta-encoded signal, as already explained for feedback of a voltage with reference to FIG. 3. In some embodiments, the controller may modify the pulse width modulated signals in response to the fed back current, for example to obtain a desired current behavior.

Furthermore, each submodule 50 in the embodiment shown comprises a microcontroller 55A, 55B (collectively referred to as microcontroller 55), respectively. Instead of microcontrollers, any other kinds of "intelligence" may be provided, and both programmable solutions and hard-wired solutions are possible. The controller may communicate with microcontrollers 55 via respective second communication channels 59A, 59B, respectively, collectively referred to as second communication channels 59. Second communication channels 59 may for example be implemented as a CAN bus or bus system. Various topologies for the second communication channel 59 are possible, for example an essentially point-to-point topology as explained with reference to FIG. 3 or an essentially ring topology as explained with reference to FIG. 4. Second communication channels 59 may be safer or more reliable communication channels than first communication channels 57.

Using microcontrollers 55, various parameters of the submodules may be supervised, and moreover via second communication channel 59 the respective submodule may be put in a state with reduced functionality or a safe state in case the respective first communication channel fails. For example, in such a safe state the switches 51 to 54 of the respective submodule 50 may be set in a defined state via the respective microcontroller 55, for example a state where all switches are open, thus deactivating the respective coil and enabling the electric motor to run using only the other coils.

Also a reduced functionality, for example using a different switching scheme of switches 51 to 54 than in normal operation, may be used.

It should be noted that in some embodiments also different kinds of submodules may be used for different coils of an electric motor or other parts of a drive train.

Figure 6:
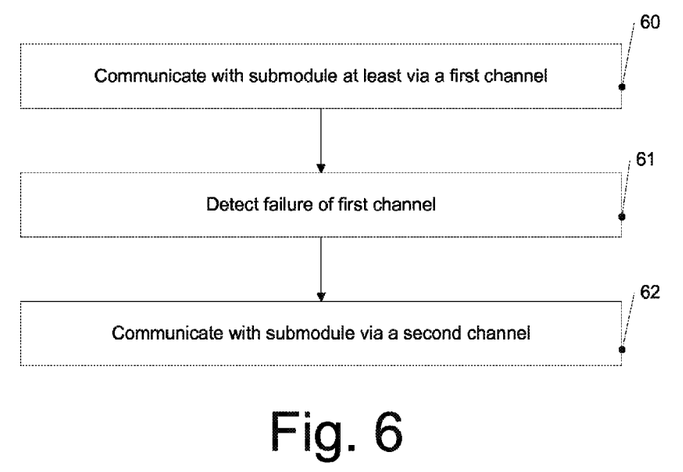
FIG. 6 is a flowchart illustrating a method of operating a controller arrangement according to an embodiment.

In FIG. 6, a flowchart illustrating a method according to an embodiment is shown. While the method of FIG. 6 may be implemented in any of the embodiments discussed with reference to FIGS. 1 to 5, it may also be implemented in other embodiments, systems or devices. While the method is depicted as a series of acts or events, the order in which these acts or events are described is not to be construed as limiting. Moreover, in other embodiments additional acts or events may be present, depicted acts or events may be omitted or may be replaced by alternative acts or events.

At 60, a controller communicates with a submodule, for example a submodule of a plurality of submodules, at least via a first communication channel. At 61, a failure of the first communication channel is detected. In response to the detected failure, at 62 the controller communicates with the submodules via a second communication channel different from the first communication channel. The second communication channel may for example be a more reliable communication channel than the first communication channel. In some embodiments, the second communication channel may be slower than the first communication channel.

In some embodiments, at 60 the controller communicates with the submodules both via the first communication channel and the second communication channel (as explained in an illustrative non-limiting manner with respect to FIGS. 2 to 4), while at 62 communication is performed only via the second communication channel, for example to take the submodule out of service or to perform a limited operation of the submodule.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blue-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for performing the techniques described herein. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

As already mentioned above, the above-described embodiments serve illustrative purposes only and are not to be construed as limiting the scope of the present application in any manner.

What is claimed is:

1. An apparatus, comprising:
a controller to control at least part of a drive train, wherein the controller is configured to:
communicate with at least one submodule of the drive train in a first mode of operation via at least a first communication channel using a first communication protocol, and
communicate with the at least one submodule of the drive train in a second mode of operation via a second communication channel using a second communication protocol different from the first communication protocol upon failure of the first communication channel.

2. The apparatus of claim 1, wherein the second communication channel is more reliable than the first communication channel.

3. The apparatus of claim 1, wherein said first communication channel comprises one or more of an optical communication channel, a wire-based communication channel or a pulse width modulated (PWM) communication channel, and wherein said second communication channel comprises a serial peripheral interface (SPI) bus.

4. The apparatus of claim 1, wherein the first communication channel enables a faster communication than the second communication channel.

5. The apparatus of claim 1, wherein said first communication channel comprises one or more of an optical communication channel, a wire-based communication channel or a pulse width modulated (PWM) communication channel, and wherein said second communication channel comprises a controller area network (CAN) bus.

6. The apparatus of claim 1, wherein said controller is configured to, in said first mode of operation, communicate with said submodule via said first communication channel and said second communication channel.

7. The apparatus of claim 6, wherein said controller is configured to, in said first mode of operation, control a first part of said submodule via said first communication channel and a second part of said submodule via said second communication channel.

8. The apparatus of claim 1, wherein said controller is configured to control said submodule to be bypassed in said second mode of operation.

9. The apparatus of claim 1, further comprising said first communication channel, said second communication channel, a submodule coupled with said first communication channel and said second communication channel, and an electric motor, a coil of said electric motor being supplied by said submodule.

10. An apparatus, comprising:
a module of a drive train configured to be controlled at least via a first communication channel using a first communication protocol in a first mode of operation, and to be controlled at least by a second communication channel using a second communication protocol different from the first communication protocol in a second mode of operation when said first communication channel fails.

11. The apparatus of claim 10, wherein said second communication channel is configured to protect data integrity better than said first communication channel.

12. The apparatus of claim 10, wherein said first communication channel has less latency than said second communication channel.

13. The apparatus of claim 10, wherein said module of the drive train is mounted to an electric motor, and wherein an output of said module of the drive train is coupled with a coil of said electric motor.

14. The apparatus of claim 10, wherein said module of the drive train comprises a direct current/alternating current (DC/AC) converter, wherein in said first mode of operation a DC part of said DC/AC converter is controlled via said first communication channel and an AC part of said DC/AC converter is controlled via said second communication channel.

15. The apparatus of claim 14, wherein said module of the drive train comprises a controller configured to receive target values via said second communication channel and to regulate said AC part in accordance with said target values.

16. The apparatus of claim 14, wherein said module of the drive train is configured to be short-circuited in said second mode of operation.

17. A method, comprising:
communicating with a submodule of a drive train control at least via a first communication channel using a first communication protocol in a first mode of operation,
detecting a failure of the first communication channel; and
upon detecting the failure, communicating with the submodule via a second communication channel using a second communication protocol in a second mode of operation, wherein the second communication protocol is different from the first communication protocol.

18. The method of claim 17, wherein the method further comprises communicating with the submodule via the second communication channel in said first mode of operation, wherein communicating via the first communication channel in the first mode of operation comprises controlling a first part of the submodule and communicating via the second communication channel in the first mode of operation comprises controlling a second part of the submodule.

19. The method of claim 17, further comprising communicating a voltage value of a DC/AC converter of said submodule to a controller using a sigma-delta-conversion.

20. The method of claim 17, wherein communicating via said second communication channel comprises communicating via a bus system.

* * * * *